United States Patent
Wentink

(10) Patent No.: US 7,969,920 B2
(45) Date of Patent: Jun. 28, 2011

(54) COMMUNICATION ROAMING SYSTEMS AND METHODS

(75) Inventor: Menzo Wentink, Utrecht (NL)

(73) Assignee: Xocyst Transfer AG L.L.C., Wilmington, DE (US)

( * ) Notice: Subject to any disclaimer, the term of this patent is extended or adjusted under 35 U.S.C. 154(b) by 345 days.

(21) Appl. No.: 11/750,693

(22) Filed: May 18, 2007

(65) Prior Publication Data

US 2007/0270171 A1  Nov. 22, 2007

Related U.S. Application Data

(60) Provisional application No. 60/801,299, filed on May 18, 2006.

(51) Int. Cl.
  H04W 36/00  (2009.01)
  H04W 48/16  (2009.01)
  H04W 74/08  (2009.01)
  H04W 76/02  (2009.01)
  H04B 7/00  (2006.01)

(52) U.S. Cl. ........ 370/278; 370/331; 370/338; 370/348; 455/432.1; 455/434; 455/437

(58) Field of Classification Search .................. 370/278, 370/331, 332, 338, 348; 455/432.1, 434, 455/436, 437, 442, 443
See application file for complete search history.

(56) References Cited

U.S. PATENT DOCUMENTS

| | | | |
|---|---|---|---|
| 7,058,071 B1 * | 6/2006 | Myles et al. | 370/419 |
| 7,158,803 B1 * | 1/2007 | Elliott | 455/512 |
| 7,184,407 B1 * | 2/2007 | Myles et al. | 370/242 |
| 7,656,854 B2 * | 2/2010 | Benveniste | 370/348 |
| 7,742,443 B2 * | 6/2010 | Wentink | 370/318 |
| 2002/0143966 A1 * | 10/2002 | Sibecas et al. | 709/229 |
| 2004/0243846 A1 * | 12/2004 | Aboba et al. | 713/201 |
| 2004/0246922 A1 * | 12/2004 | Ruan et al. | 370/331 |
| 2005/0135318 A1 * | 6/2005 | Walton et al. | 370/338 |
| 2006/0154662 A1 * | 7/2006 | Kil et al. | 455/435.1 |
| 2006/0171357 A1 * | 8/2006 | King et al. | 370/331 |
| 2006/0187873 A1 * | 8/2006 | Friday et al. | 370/328 |
| 2006/0227731 A1 * | 10/2006 | Shun et al. | 370/310 |
| 2006/0258350 A1 * | 11/2006 | Roy et al. | 455/435.1 |
| 2007/0019584 A1 * | 1/2007 | Qi et al. | 370/331 |
| 2007/0025388 A1 * | 2/2007 | Abhishek et al. | 370/447 |
| 2007/0091864 A1 * | 4/2007 | Honjo et al. | 370/338 |
| 2007/0118742 A1 * | 5/2007 | Abhishek et al. | 713/160 |
| 2007/0140191 A1 * | 6/2007 | Kojima | 370/338 |
| 2007/0184832 A1 * | 8/2007 | Faccin et al. | 455/432.1 |
| 2007/0232307 A1 * | 10/2007 | Ibrahim et al. | 455/436 |
| 2007/0249291 A1 * | 10/2007 | Nanda et al. | 455/73 |
| 2007/0291725 A1 * | 12/2007 | Kowalski | 370/338 |

(Continued)

OTHER PUBLICATIONS

IEEE Standard for Information Technology. ANSI/IEEE Std 802.11, 1999 Edition. Part 11: Wireless LAN Medium Access Control (MAC) and Physical Layer (PHY) Specification, pp. 1-528. Adopted by the ISO/IEC and Redesignated as ISO/IEC 8802-11:1999(E).

(Continued)

*Primary Examiner* — Chi H Pham
*Assistant Examiner* — Ahmed Elallam

(57) ABSTRACT

Embodiments of communication roaming systems and methods are disclosed. One method embodiment, among others, comprises sending a frame to a station based on an identifier of the station to prompt an immediate response frame, and determining whether the station is suitable for association based on information corresponding to receipt of the immediate response frame or based on non-receipt of the immediate response frame.

39 Claims, 4 Drawing Sheets

U.S. PATENT DOCUMENTS

| | | | |
|---|---|---|---|
| 2008/0031200 A1* | 2/2008 | Tang | 370/338 |
| 2008/0056211 A1* | 3/2008 | Kim et al. | 370/338 |
| 2008/0198811 A1* | 8/2008 | Deshpande et al. | 370/332 |
| 2008/0280621 A1* | 11/2008 | Soomro et al. | 455/450 |
| 2009/0080399 A1* | 3/2009 | Wang et al. | 370/338 |
| 2009/0207758 A1* | 8/2009 | Jeong et al. | 370/254 |

OTHER PUBLICATIONS http://msdn2.microsoft.com/en-us/library/aa503361.aspx; Copyright 2008 Microsoft Corporation, one page.

http://www.drizzle.com/%7Eaboba/IEEE/11-04-0377-01-frfh-analysis-roaming-techniques.ppt; Areg Alimian, and Bernard Aboba; Analysis of Roaming Techniques, Mar. 2004, slides 1-24.

* cited by examiner

COMMUNICATION ROAMING SYSTEMS AND METHODS

CROSS-REFERENCE TO RELATED APPLICATION

This application claims priority to U.S. provisional application having Ser. No. 60/801,299, filed on May 18, 2006, which is incorporated herein by reference in its entirety.

BACKGROUND

1. Field of the Invention

The present disclosure is generally related to communication systems, and, more particularly, is related to wireless communication systems and methods.

2. Related Art

Wireless communication systems are widely deployed to provide various types of communication, such as voice, data, and so on. Much has changed in the way of wireless devices from the early days of bulky walkie-talkies and base-mounted car phones. Miniaturization of components and advancements in protocols and methods over the years have resulted in cell phones that can rest on an ear lobe, multi-media entertainment devices like the IPOD that provide hours of entertainment while fitting comfortably in the palm of one's hand, or digital cameras that can store and transmit literally hundreds of pictures.

Consumers desire low-profile devices, but not at the expense of performance. For instance, consider cell phones. Consumers generally prefer to have long-lasting operation in terms of battery power while retaining the ability to pick up their phone at any time or location and enjoy optimal reception. However, these performance features are often subject to competing interests. That is, current technology implements roaming to determine the proximity to various stations (e.g., peer stations or access points). Roaming may be performed during periods that a consumer is engaged in a call, or during standby (e.g., when the consumer is not engaged in a call), and typically is implemented using active scanning or passive scanning.

In passive scanning, the station (e.g., as embodied in a cell phone) may read from an access point list (e.g., temporarily loaded into memory of the station from an access point through the most recent association), and then tune into the various channels corresponding to the listed access points. At each tuned channel (e.g., frequency band), the station waits and listens for a beacon. Beacons are typically sent every 100 milliseconds (msecs). When the beacon is received, the station can determine the suitability (reliability of the signal reception, and often correlated with the proximity) of the access point for potentially future association. Such a determination may be made by evaluating the signal strength according to techniques well-known to those having ordinary skill in the art. Through this process, the access point list is narrowed to a candidate list of suitable access points for potential future association (e.g., when the consumer decides to make a call, or when passage to a different cell is to take place). However, this process of tuning, waiting (e.g., 100 msec), determining, tuning, waiting, etc. can be time-consuming, and consequently can impose a significant drain on the battery of the station, especially in standby mode.

Active scanning is typically an improvement in speed over passive scanning, and generally entails the station sending out a probe request (e.g., a broadcast frame) on channels identified in the access point list. All access points that receive the probe request prepare a probe response frame for transmission back to the station. However, this technique is also time-consuming since the probe request is typically a long frame comprising a substantial amount of information, and further because the frame is sent at a low frame rate to ensure that all access points from the list are reached. Adding to the delay is the preparation and reply transmission time at the access point (e.g., typically 2-4 msecs).

SUMMARY

Embodiments of communication roaming systems and methods are disclosed. One method embodiment, among others, comprises sending a frame to a station based on an identifier of the station to prompt an immediate response frame, and determining whether the station is suitable for association based on information corresponding to receipt of the immediate response frame or based on non-receipt of the immediate response frame.

One system embodiment, among others, comprises a first station configured to transmit a frame to a station based on an identifier of the station to prompt an immediate response frame, and determine proximity to the station based on information corresponding to receipt of the immediate response frame or based on non-receipt of the immediate response frame.

Another system embodiment, among others, comprises means for reading a list comprising an identifier of a station, means for sending a frame to the station to prompt an immediate response, means for receiving the immediate response, and means for determining whether the station is suitable for association based on the immediate response.

Other systems, methods, features, and advantages of the present disclosure will be or become apparent to one with skill in the art upon examination of the following drawings and detailed description. It is intended that all such additional systems, methods, features, and advantages be included within this description, and be within the scope of the present disclosure.

BRIEF DESCRIPTION OF THE DRAWINGS

Many aspects of the disclosed systems and methods can be better understood with reference to the following drawings. The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed herein are various embodiments of communication roaming systems and methods, herein collectively referred to also as communication roaming systems. Such communication roaming systems are described below in the context of 802.11-compliant, communication systems, though the principles described herein can be extended to other communication systems and protocols and hence are not so limited.

Certain embodiments of the communication roaming systems access a list of stations (e.g., access points, peer stations, etc.) that comprise information (e.g., identifiers, such as media access control address, among other information), and then send a short frame to the listed stations to prompt an immediate response from which a determination can be made as to the suitability of the listed station for potential future association. Such suitability can be based on one or more factors, such as signal strength (e.g., energy level), the quality of the link, proximity to the originating station, and/or the presence of a response in the first place.

The short frame and immediate response frames can include frame exchanges known to 802.11-compliant basic service set (BSS) systems, independent BSS (IBSS) systems, or other frame exchanges known to other systems and/or protocols outside of the scope of 802.11. Further, considerable savings in processing time and hence power consumption (e.g., by the battery) may be saved relative to conventional systems and/or techniques through the short frame and immediate response frame exchange.

Although described in the context of a BSS system, it should be appreciated in the context of the present disclosure that IBSS systems also apply. For instance, access point (AP) lists are explained below as an exemplary list that can be read by a given station as a preliminary procedure to the frame exchanges described herein. Though AP lists are not used in adhoc (IBSS) networks, based on the present disclosure, the described lists can be extended to lists for adhoc networks with similar structures (e.g., having an identifier and/or other information pertaining to the identity of the target or peer station). Additionally, though described in the context of a standby mode, the various techniques described herein can be extended to non-standby implementations.

Figure 1:
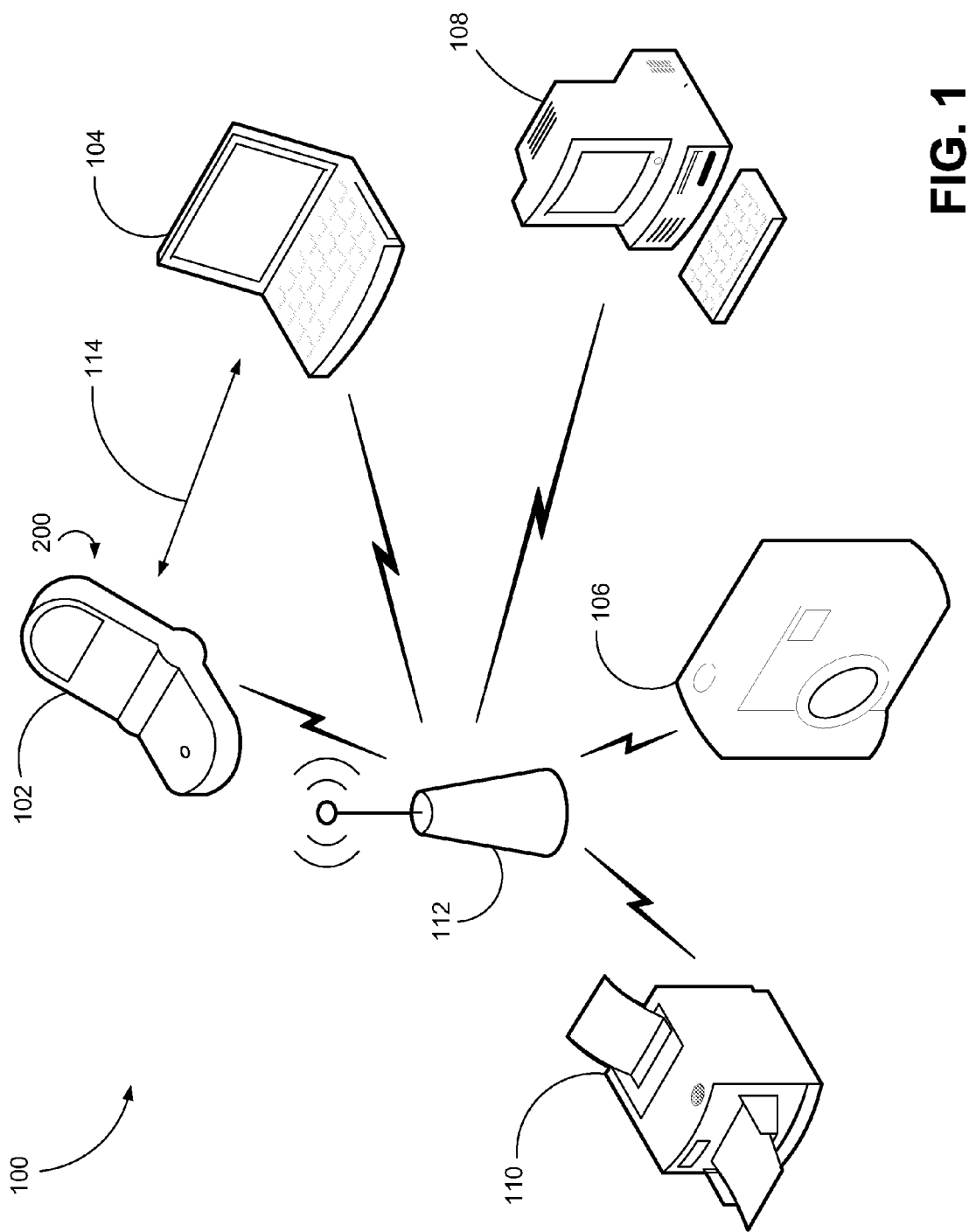
FIG. 1 is a block diagram of an exemplary communication environment in which embodiments of communication roaming systems and methods can be implemented.

FIG. 1 is a block diagram of an exemplary communication environment 100 in which embodiments of communication roaming systems and methods can be implemented. The environment 100 comprises a plurality of wireless and wired devices, one or more of which may be configured to operate as a wireless and wired device. One or more of the devices shown in FIG. 1 may incorporate communication roaming systems and methods, as described further below. Exemplary wireless devices include a cell phone 102, a laptop computer 104 (which may communicate with the cell phone 102 in a direct link mechanism represented by link 114, such as disclosed in 802.11e), and a digital camera 106. The wired devices (e.g., with wireless capability) include a personal computer (PC) 108 and a printer 110. In the exemplary environment 100 shown in FIG. 1, the cell phone 102 is in communication (e.g., radio frequency communication) with the laptop 104 and the PC 108 via an access point (AP) 112, and the digital camera 106 is in communication with the printer 110 and the PC 108 via the AP 112. For instance, such communications may be used to load pictures from the digital camera 106 to the PC 108. For illustrative purposes, the cell phone 102 is shown as an appliance that embodies an embodiment of the communication roaming system 200, though not limited to this arrangement.

Note that communication between the various devices may employ one or more of a plurality of protocols, including 802.11 (e.g., 802.11a, 802.11b, 802.11e, 802.11g, 802.11n), WiMax, Ultra-Wide Band (UWB), Bluetooth, among other technologies. Additionally, although the communication environment 100 is shown as a basic service set (BSS) configuration, in some embodiments, communication among one or more devices may be implemented using peer-to-peer (also known as adhoc in many wireless technologies) communication in lieu of or in addition to communication through the AP 112.

Figure 2:
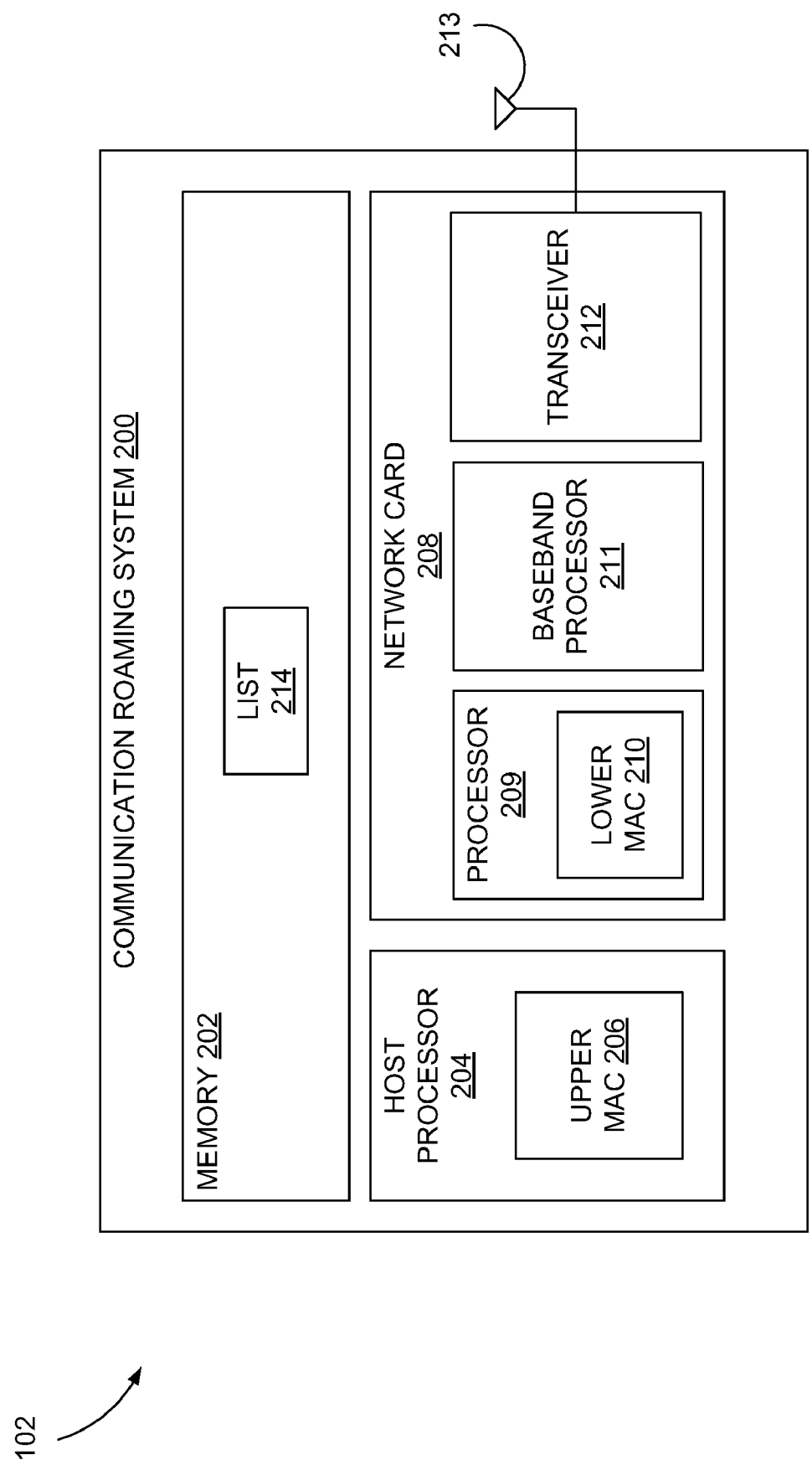
FIG. 2 is a block diagram that illustrates an embodiment of a communication roaming system embodied in one of the devices shown in FIG. 1.

FIG. 2 is a block diagram that illustrates an embodiment of a communication roaming system 200 executed in the cell phone 102 shown in FIG. 1, with the understanding that the other devices may embody the communication roaming system 200 in addition to, or in lieu of, the cell phone 102. Note that the devices shown in FIGS. 1 and 2 are exemplary in nature, and that the communication roaming system 200 may be implemented in one of a plurality of different devices or appliances, including computers (desktop, portable, laptop, etc.), consumer electronic devices (e.g., multi-media players, music players), compatible telecommunication devices, personal digital assistants (PDAs), or any other type of network devices, such as printers, fax machines, scanners, hubs, switches, routers, set-top boxes, televisions with communication capability, etc.

The communication roaming system 200 can be implemented using digital circuitry, analog circuitry, or a combination of both, and is embodied in one embodiment using a combination of hardware and software. As to hardware, one or more components of the communication roaming system 200 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In one embodiment, the communication roaming system 200 comprises a memory 202, a host processor (or media access controller in some embodiments) 204 executing code (e.g., a driver) referred to also as an upper MAC 206, and a network card 208 (e.g., network interface card or wireless card) coupled to the host processor 204, the network card 208 comprising a processor or media access controller 209 executing code referred to as a lower MAC 210, a baseband processor 211 coupled to the processor 209, a transceiver 212 coupled to the baseband processor 211, and an antenna 213 coupled to the transceiver 212. Note that the above-described components of the communication roaming system 200 are also collectively referred to as a station. In some embodiments, a station may comprise additional or different components. Further, in some embodiments, the lower MAC 210 can be incorporated into the baseband processor 211. The transceiver 212 comprises in one embodiment such well-known transceiver components including filters, amplifiers (e.g., power amplifiers, switches, etc.). The host processor 204 and processor (or media access controller) 209 may each be embodied as a digital signal processor (DSP), a microprocessor (MCU), a general purpose processor, or an application specific integrated circuit (ASIC), among others devices. One having ordinary skill in the art should appreciate that additional components not shown can be used (e.g., a host processor interface, various busses, etc.), yet which are omitted for brevity.

In one embodiment, access to and reading from and/or writing to a list 214 (e.g., AP list) stored in memory 202 is under the control of the upper MAC 206 as executed by the host processor 204, and the preparation, transmission, and reception of frames, as well as the determination of suitability of an access point (e.g., access point 112) from which an immediate response is sent (e.g., through evaluation of signal strength) is under the control of the lower MAC 210 as executed by the processor 209. In some embodiments, control of the aforementioned functionality is solely by either the upper MAC 206 or the lower MAC 210, and in some embodiments, the execution of the MACs 206 and 210 may be implemented via a single processor or on more than two processors. In some embodiments, functionality of the upper and lower MACs 206 and 210 may be collectively performed in a single MAC.

In one embodiment, the upper MAC 206 and lower MAC 210 each comprise software (e.g., firmware) residing on the respective processors 204 and 209, respectively, and that is executed by a suitable instruction execution system. In some embodiments, functionality of the upper MAC 206 and lower MAC 210 may comprise software stored in memory (e.g., memory 202) or other computer readable medium (e.g., optical, magnetic, semiconductor, etc.), and executed by the host processor 204 or other processor.

Figure 3:
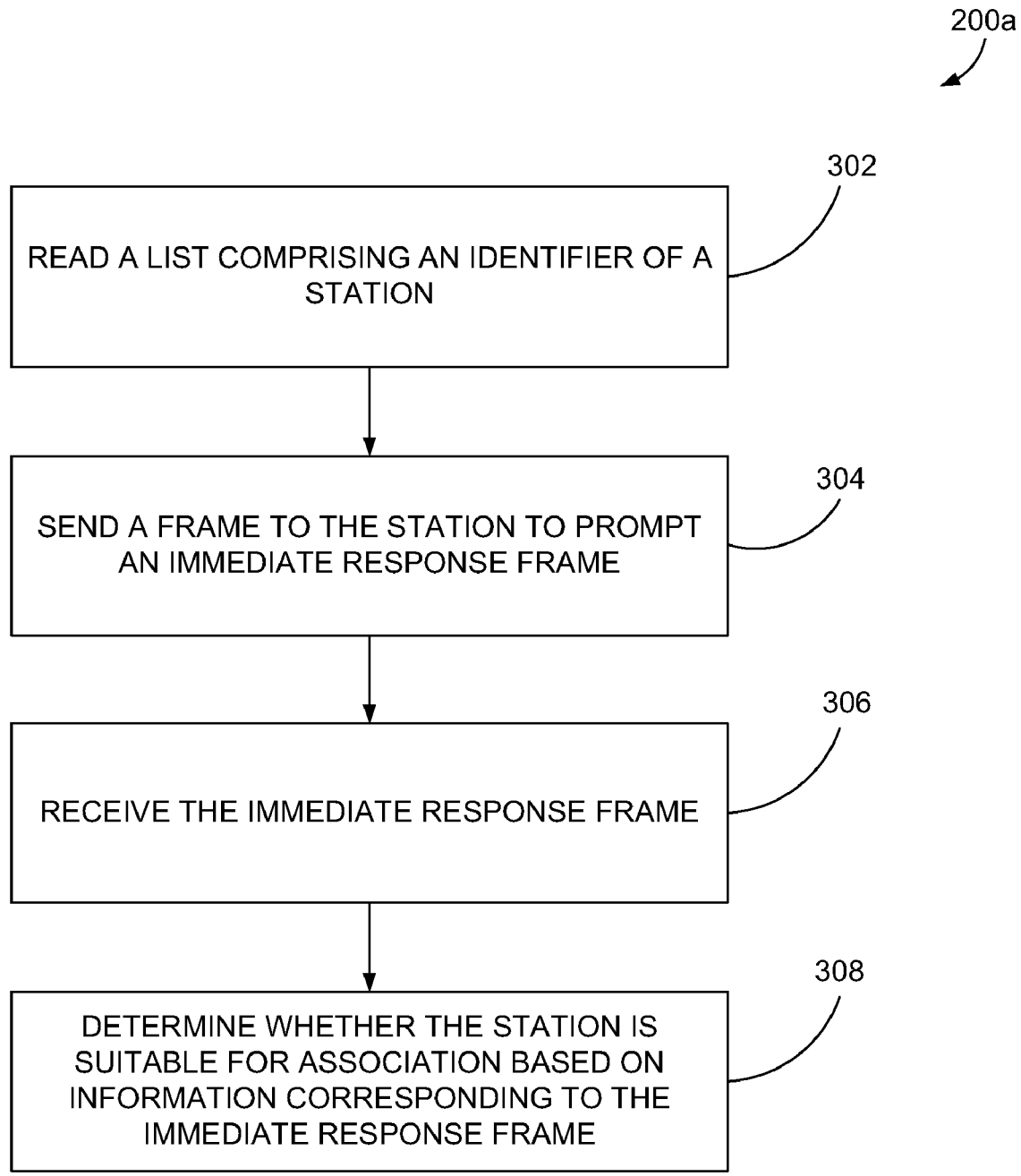
FIG. 3 is a flow diagram that illustrates an embodiment of a communication roaming method executed by the communication roaming system shown in FIG. 2.

Having described one embodiment of a communication roaming system 200, one method embodiment, denoted as method 200a and shown in FIG. 3, comprises, reading a list 214 (e.g., an AP list, among other types of lists) comprising an identifier of a station (302). The station may be an access point (e.g., access point 112) in a BSS configuration, a peer station in a direct link of a BSS configuration, a peer station in an adhoc network, or a peer station in no specific configuration. The identifier may be a media access control (MAC) address (e.g., basic service set identifier, or BSSID), or other type of identification for a target station (e.g., non-AP). The list 214 may be configured as a data structure (e.g., database) that, in one embodiment, is received by the network card 208, forwarded to the host processor 204, and temporarily stored in the memory 202 (or other memory). For instance, the list 214 may have been obtained from a previous scan (e.g., active, passive, or a combination of both), from a neighborhood list (e.g., 802.11k), and/or it may have been obtained from the AP of the current association. In some embodiments, a list is not used and the identifier is obtained though a different process.

The list 214 may also comprise additional information (e.g., in addition to the MAC address), corresponding to the one or more access points 112 or stations in general, including for example a channel (e.g., frequency band) on which the access point (e.g., access point 112) receives frames, capabilities of the access point, such as whether the access point is compliant to 802.11a, b, g, etc., the type of security supported by the access point, among other information.

Updating of the list 214 may be implemented as an automatic process without the use of scans (e.g., 802.11k neighbor lists), although updating through scanning is also encompassed within the scope of the embodiments described herein. With automatic updates of such detailed lists without a scan, a station may obviate the need to send a probe request (active scan) or receive beacons (passive scans) as a precursor to obtaining signal strength information or the current proximity of a station.

Continuing the method 200a, the communication roaming system 200 sends (e.g., transmits) a frame to the station (or stations) identified on the list 214 to prompt an immediate response frame (304). That is, the communication roaming system 200 checks for the presence and signal strength of the stations identified on the list 214 using a short frame exchange, such as a request to send/clear to send (RTS/CTS) exchange, null/acknowledgement (ACK) exchange, and/or quality of service (QoS)-null/ACK exchange. The exchange may be slightly delayed by at least a short interframe space (SIFS) interval (e.g., 16 microseconds). That is, between the time of receipt of the frame by the target station or access point, and the sending of the immediate response frame, an insubstantial delay may be implemented (the SIFS interval). Note that the initiating frames do not need to be transmitted at a prescribed rate (i.e., control frames in 802.11 are transmitted at a basic rate, but transmission at the basic rate is not a requirement for the communication roaming system 200). For instance, if the scanning device intends to find a nearby device, it may send the initiating frame at a relatively high rate, thereby reducing its range, length, and/or the required transmission time (which saves power).

The RTS frame can be sent since the MAC address is known (e.g., from the list 214), and hence provides certain benefits. For instance, the RTS frame is a low-level MAC feature, and hence represents a frame that can be depended upon to elicit a response from a proximate station regardless of whether association exists or not between the communication roaming system 200 and the responding station. Further, the RTS frame is not encrypted, avoiding decryption processing (though encrypted responses/transmissions are not excluded from the disclosed embodiments). The signal strength can be readily determined based on information in the CTS frame. As explained above, the exchange of frames is not limited to control frames (e.g., RTS/CTS), but may also include data frames (e.g., null) among other types of frames. That is, the frame used for transmission to the listed station (e.g., access point) comprises an address or identification (collectively, also identifier) of the station sending the frame and the address or identification of the station sending the immediate response frame.

The communication roaming system 200 receives the immediate response frame (306), and then determines whether the station is suitable for association (e.g., association under 802.11 between a client station and an access point) based on information corresponding to the immediate response frame (308). Generally, such a determination is based on known-mechanisms of determining signal strength and/or proximity and/or channel quality from the information conveyed in the response frame and the signal processing on the received frame. From the determination of proximity or signal strength, the list can be further narrowed (or candidate stations on the list can be flagged) or otherwise modified, or in some embodiments, replaced with a new list having identifiers of one or more of the most suitable stations listed.

In some embodiments, the immediate response may not be received, which may result in a determination that the station from which an immediate response frame was expected is not a suitable station (e.g., not proximate to the sending station, the link is of poor quality, etc.). Hence, another method embodiment, referred to herein as method 200b and shown in FIG. 4, comprises sending (e.g., transmitting) a frame to a station based on an identifier of the station to prompt an immediate response frame (402), and determining whether the station is suitable for association based on information corresponding to receipt of the immediate response frame or based on non-receipt of the immediate response frame (404). That is, as part of the determination process, the station may receive the immediate response frame or may not receive the immediate response frame, which enables a determination as to the suitability or unsuitability of the station that is expected to send the immediate response frame.

Figure 4:
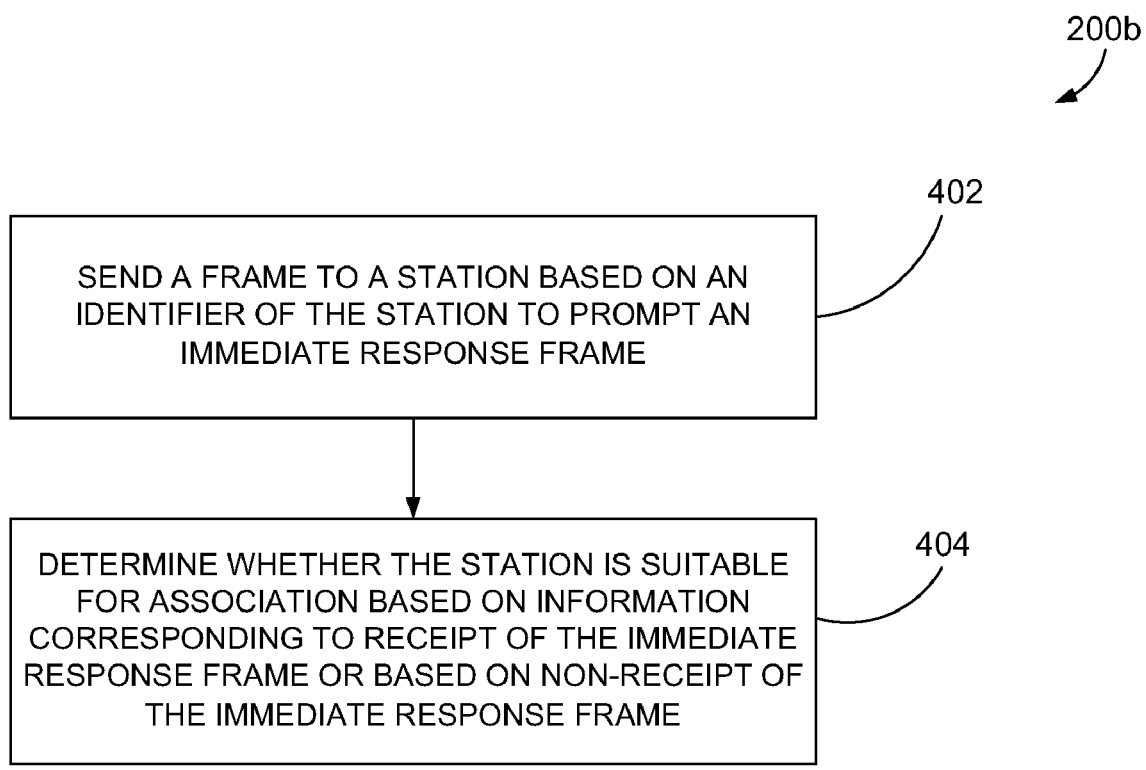
FIG. 4 is a flow diagram that illustrates an embodiment of a communication roaming method executed by the communication roaming system shown in FIG. 2.

Any process descriptions or blocks in flow diagrams shown in FIGS. 3 and 4 should be understood as representing modules, segments, or portions of code which include one or more executable instructions for implementing specific logical functions or steps in the process, and alternate implementations are included within the scope of the embodiments described herein in which functions may be executed out of order from that shown or discussed, including substantially concurrently or in reverse order, depending on the functionality involved, as would be understood by those reasonably skilled in the art. Additionally, the methods illustrated in the flow diagrams of FIGS. 3 and 4 are not limited to the system embodiments shown in FIGS. 1 and 2, but may be extended to other architectures and systems as should be appreciated by one having ordinary skill in the art in the context of this disclosure.

It should be emphasized that the above-described embodiments are merely possible examples of implementations, merely set forth for a clear understanding of the principles of the disclosure. Many variations and modifications may be made to the above-described embodiment(s) without departing substantially from the scope of the disclosure. All such modifications and variations are intended to be included herein within the scope of this disclosure.

At least the following is claimed:

1. A method, comprising:
   sending a frame from a first station to an unassociated second station based on an identifier of the unassociated second station, wherein the frame is selected from a group consisting of a control frame, a null data frame, a request to send (RTS) control frame, and a null quality of service (QoS) frame, and wherein the frame is configured to prompt a response frame from the unassociated second station after a short interframe space (SIFS) interval after receiving the frame; and
   determining whether the unassociated second station is suitable for association with the first station based on information corresponding to receipt of the response frame or based on non-receipt of the response frame.

2. The method of claim 1, wherein the identifier comprises a media access control address of the second station.

3. The method of claim 1, further comprising reading at the first station a list comprising the identifier of the second station.

4. The method of claim 3, wherein the list further comprises additional identifiers and information corresponding to additional stations.

5. The method of claim 4, further comprising sending from the first station an additional frame to each of the additional stations which are not associated with the first station, wherein the additional frame is selected from a group consisting of a control frame, a null data frame, a request to send (RTS) control frame, and a null quality of service (QoS) frame, and wherein the additional frame is configured to prompt a response frame from each of the additional stations after a short interframe space (SIFS) interval after receiving the additional frame.

6. The method of claim 5, further comprising determining whether the additional stations are suitable for association with the first station based on information corresponding to the response frame from the respective stations or based on the non-receipt of the response frame from the respective stations.

7. The method of claim 3, wherein the list further comprises additional information corresponding to the second station.

8. The method of claim 7, wherein the additional information comprises a channel identifier corresponding to a channel on which the second station is accessible.

9. The method of claim 3, further comprising modifying or replacing the list comprising the identifier based on the determination.

10. The method of claim 1 further comprises sending the frame at a non-basic rate.

11. The method of claim 1, wherein the determining further comprises receiving the response frame from the second station.

12. The method of claim 11, wherein the response frame is one of a clear to send (CTS) frame and an acknowledgement (ACK) frame.

13. The method of claim 1, wherein the determining further comprises determining one or more of a signal strength of a signal conveying the response frame, or a link quality between the first station and the second station.

14. The method of claim 1, wherein the determining further comprises determining that the second station is unsuitable for association based on the non-receipt of the response frame.

15. The method of claim 1, wherein the frame comprises the identifier of the second station and an identifier of the first station.

16. The method of claim 1, wherein the sending and determining are executed by the first station while the first station is in a standby mode.

17. The method of claim 1, wherein the determining by the first station further comprises determining a proximity of the second station.

18. A first station comprising:
    a transmitter configured to transmit a frame to an unassociated second station based on an identifier of the unassociated second station, wherein the frame is selected from a group consisting of a control frame, a null data frame, a request to send (RTS) control frame, and a null quality of service (QoS) frame, and wherein the frame is configured to prompt a response frame from the unassociated second station after a short interframe space (SIFS) interval after receiving the frame; and
    a processor configured to determine whether the unassociated second station is suitable for association with the first station based on information corresponding to receipt of the response frame or based on nonreceipt of the response frame.

19. The first station of claim 18, further comprising a memory to store a list comprising the identifier.

20. The first station of claim 19, wherein the processor is further configured to execute media access control software to read the list, the list comprising at least one of a media access control address and a channel identifier corresponding to a channel on which the second station is accessible.

21. The first station of claim 19, wherein the processor is further configured to execute media access control software to modify or replace the list comprising the identifier based on the determination.

22. The first station of claim 18, wherein the processor is further configured to execute media access control software in cooperation with a transceiver to transmit the frame as a control frame or a null data frame.

23. The first station of claim 18, wherein the first station is a peer station in a direct link, adhoc, or infrastructure network.

24. The first station of claim 18, wherein the response frame is sent by the second station after a short interframe space (SIFS) interval of receiving the frame.

25. The first station of claim 18, wherein the information is signal strength information.

26. The first station of claim 18, wherein the response frame is one of a clear to send (CTS) frame and an acknowledgement (ACK) frame.

27. The first station of claim 18, wherein the processor is further configured to execute media access control software to determine that the non-receipt of the response frame indicates that the second station is not suitable for association.

28. The first station of claim 18, wherein the frame is transmitted at a non-basic rate.

29. The first station of claim 18, wherein the processor is further configured to determine a proximity of the second station based on information corresponding to receive of the response frame.

30. A system, comprising:
   means for reading a list comprising an identifier of a station that is unassociated with the system;
   means for sending a frame to the station, wherein the frame is configured to prompt a response frame from the station after a short interframe space (SIFS) interval after receiving the frame and wherein the frame is selected from a group consisting of a control frame, a null data frame, a request to send (RTS) control frame, and a null quality of service (QoS) frame;
   means for receiving the response frame; and
   means for determining whether the unassociated station is suitable for association based on the response frame.

31. The system of claim 30, wherein the frame is sent at a non-basic rate.

32. The system of claim 30, wherein the response frame is selected from a group consisting of a clear to send frame and an acknowledgement frame.

33. The system of claim 30, wherein the means for determining further comprises determining a proximity of the second station.

34. An article of manufacture including a non-transitory computer readable medium having instructions stored thereon that, if executed by a computing device, cause the computing device to perform operations comprising:
   sending a frame to an unassociated second station based on an identifier of the unassociated second station, wherein the frame is selected from a group consisting of a control frame, a null data frame, a request to send (RTS) control frame, and a null quality of service (QoS) frame and wherein the frame is configured to prompt a response frame from the unassociated second station after a short interframe space (SIFS) interval after receiving the frame; and
   determining whether the unassociated second station is suitable for association based on information corresponding to receipt of the response frame or based on non-receipt of the response frame.

35. The article of manufacture of claim 34, further comprising instructions that, if executed by a computing device, cause the computing device to perform operations comprising:
   reading a list comprising the identifier of the second station.

36. The article of manufacture of claim 35, further comprising instructions that, if executed by a computing device, cause the computing device to perform operations comprising:
   reading the list comprising identifiers of additional stations.

37. The article of manufacture of claim 34, further comprising instructions that, if executed by a computing device, cause the computing device to perform operations comprising:
   sending the frame at a non-basic rate.

38. The article of manufacture of claim 34, wherein the response frame is selected from a group consisting of a clear to send (CTS) frame and an acknowledgement (ACK) frame.

39. The article of manufacture of claim 34, further comprising instructions that, if executed by a computing device, cause the computing device to perform operations comprising:
   determining a proximity of the second station.

* * * * *

UNITED STATES PATENT AND TRADEMARK OFFICE
CERTIFICATE OF CORRECTION

PATENT NO. : 7,969,920 B2 Page 1 of 1
APPLICATION NO. : 11/750693
DATED : June 28, 2011
INVENTOR(S) : Wentink It is certified that error appears in the above-identified patent and that said Letters Patent is hereby corrected as shown below:

Column 8, line 38, in Claim 18, delete "nonreceipt" and insert -- non-receipt --.

Signed and Sealed this
Eighth Day of November, 2011

David J. Kappos
*Director of the United States Patent and Trademark Office*